United States Patent
Doumaux et al.

(10) Patent No.: US 7,452,415 B2
(45) Date of Patent: Nov. 18, 2008

(54) PIGMENT-BASED INK SETS FOR INK-JET PRINTING

(75) Inventors: Howard Doumaux, San Diego, CA (US); Katie Nifong Burns, San Diego, CA (US); David Mahli, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 148 days.

(21) Appl. No.: 11/290,094

(22) Filed: Nov. 30, 2005

(65) Prior Publication Data

US 2007/0120926 A1    May 31, 2007

(51) Int. Cl.
   *C09D 11/02*   (2006.01)
(52) U.S. Cl. .................................. 106/31.6
(58) Field of Classification Search .............. 106/31.6
   See application file for complete search history.

(56) References Cited

U.S. PATENT DOCUMENTS

| | | |
|---|---|---|
| 4,170,582 A | 10/1979 | Mori et al. |
| 4,740,546 A | 4/1988 | Masuda et al. |
| 5,051,464 A | 9/1991 | Johnson et al. |
| 5,556,583 A | 9/1996 | Tashiro et al. |
| 5,741,591 A | 4/1998 | Tashiro et al. |
| 6,074,467 A | 6/2000 | Tabayashi et al. |
| 6,494,943 B1 | 12/2002 | Yu et al. |
| 6,506,240 B2 | 1/2003 | Takemoto et al. |
| 6,555,614 B2 | 4/2003 | Takanashi et al. |
| 6,648,953 B2 | 11/2003 | Yamazaki et al. |
| 6,997,979 B2* | 2/2006 | Bauer et al. ............ 106/31.6 |
| 7,204,873 B2 | 4/2007 | Bauer et al. |
| 7,217,315 B2* | 5/2007 | Bauer et al. ............ 106/31.6 |
| 7,294,186 B2 | 11/2007 | Bauer et al. |
| 2001/0035110 A1 | 11/2001 | Kato |
| 2002/0005146 A1 | 1/2002 | Palumbo et al. |
| 2002/0130936 A1 | 9/2002 | Sano et al. |
| 2003/0121446 A1 | 7/2003 | Taniguchi et al. |
| 2003/0195274 A1 | 10/2003 | Nakamura et al. |
| 2003/0195275 A1 | 10/2003 | Sanada et al. |
| 2003/0205171 A1 | 11/2003 | Adams et al. |
| 2003/0213410 A1 | 11/2003 | Adams et al. |
| 2005/0171239 A1* | 8/2005 | Bauer et al. ............ 523/160 |
| 2005/0171240 A1* | 8/2005 | Bauer et al. ............ 523/160 |
| 2005/0250869 A1* | 11/2005 | Claes et al. ............ 522/71 |

FOREIGN PATENT DOCUMENTS

| | | |
|---|---|---|
| EP | 1270690 A1 | 1/2003 |
| EP | 1413609 | 4/2004 |
| EP | 1559755 | 8/2005 |
| EP | 1559758 | 8/2005 |
| EP | 1589081 | 10/2005 |

OTHER PUBLICATIONS

CIE Technical Report: "Improvement ot Industrial Colour-Difference Evaluation," 2001, www.cie.co.at, 19 pages.
DiCosola, Michael, "Understanding Illuminants," X-Rite, Inc., Aug. 25, 1995, 10 pages.
International Search Report, Mailed Aug. 30, 2007.
Written Opinion of International Searching Authority, Mailed Aug. 30, 2007.

* cited by examiner

*Primary Examiner*—Jerry Lorengo
*Assistant Examiner*—Veronica Faison Gee

(57) ABSTRACT

Ink systems and combinations thereof that include neutral gray or black ink and at least one other pigment with matched light fastness are disclosed. Also disclosed are methods of printing.

33 Claims, 1 Drawing Sheet

PIGMENT-BASED INK SETS FOR INK-JET PRINTING

TECHNICAL FIELD

The present invention relates to black and gray pigmented inks that are used to create neutral colors for ink-jet printing.

BACKGROUND

To achieve true silver halide photo image quality in inkjet printing, multiple levels of black inks generally need to be used. Within the black inks, light pigment load (gray ink) is necessary for reducing grain and dot visibility, and high pigment load is necessary for high optical density and high color gamut volume. In photo printing, carbon black is usually the primary ingredient of black pigmented ink. One fundamental limitation with carbon black is "browning," which is a brownish undertone that develops when it is used at low concentration, as in a gray ink. Indeed, when used in diluted quantities, black colorants can have other non-neutral hues, such as green, red, or blue, depending on the black dye or black pigment used. This is especially true with the grades of carbon black typically used to make photo quality inks.

One way to treat the problems arising from the use of carbon black in black or gray inkjet ink has been to heavily use composite black throughout the color map. Composite black as conventionally used is a mixture of cyan, magenta and yellow inks and is used to create neutral gray colors. Neutral gray ink improves color accuracy in near neutral colors and reduces overall ink usage. Composite black has a known set of issues. For example, the light fastness of the components is varied. The term "light fastness" as used herein refers to the durability of a print when exposed to light. When an ink is light fast, it has fade resistance. Composite black also can have excessive metamerism, where the color appearance substantially changes upon change of illuminant.

Balanced lightfastness can be important in a photographic system for several reasons. Ideally, the life of the various component colors should fail at nearly the same time to avoid undesirable color change. Another reason is to avoid developing and paying for higher performance colorants than are required if the colorant in question does not fail first, all other things being equal. In other words, it is undesirable to use a more expensive, higher performance material that is potentially more difficult to work with, and which delivers no benefit in terms of increases lightfastness.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding, but not necessarily identical, parts throughout the several views.

DETAILED DESCRIPTION

Figure 1:
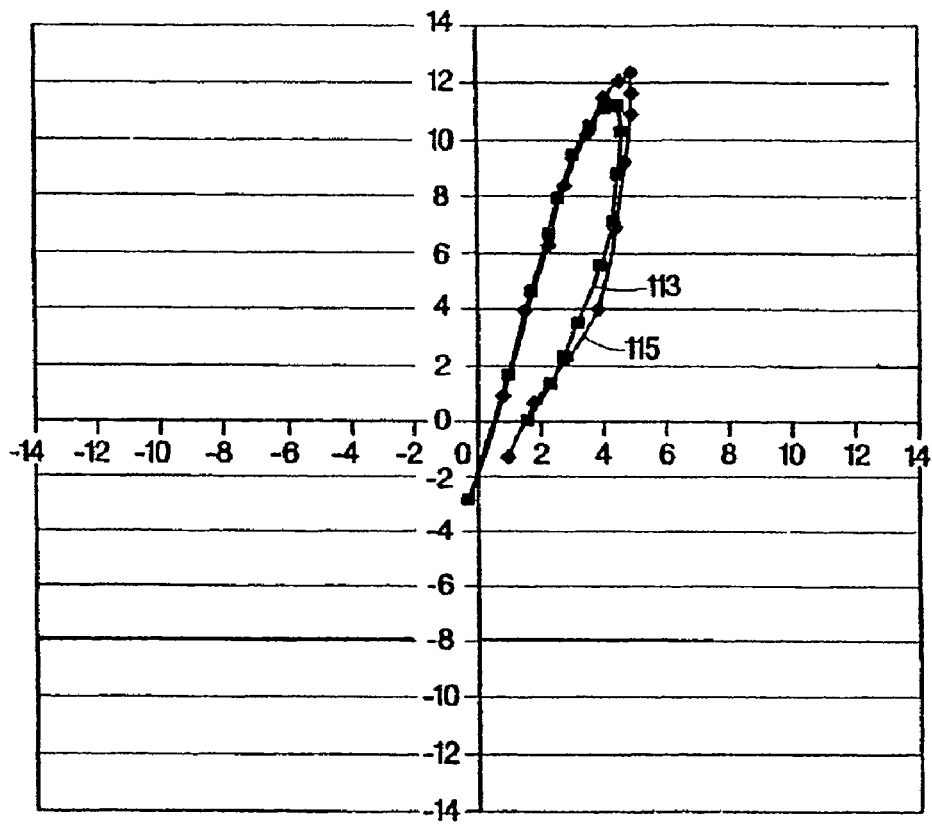
FIG. 1 is a graph in a*b* colorspace showing the browning of two gray inks made of pure carbon black.

The present disclosure relates to colorant sets including black and gray ink-jet inks, specifically those including inks with black, cyan, magenta, and yellow pigments, and are neutral over a wide media range and illumination type. In addition, the colorant sets have balanced lightfastness, e.g., all pigments fade and/or fail at approximately the same rate or time. The disclosed colorant sets provide excellent neutrality and reduced browning and color hues of carbon black containing inks. Browning is the appearance of a brownish undertone in carbon black due to decreasing absorptivity with longer wavelength light. These neutral inks provide a solution for black and white printing with a color inkjet device.

To achieve true AgX photo quality, multiple levels of black/gray inks can be used. Light pigment load (gray ink) is used for reducing grain and dot visibility, and high pigment load is used for high optical density and hence high color gamut volume. Additional levels of gray reduce the perceived grain in the transitions from a lighter to a darker ink.

Carbon black has traditionally been used for black and gray inks in such applications. One fundamental limitation with carbon black is the brownish or reddish undertone when it is used at low concentration as in gray ink. This is especially true with the photo grade carbon black.

In the present disclosure, a pigment-blend approach is used to make the photo black and gray inks. Blending cyan and magenta or violet pigments into the carbon black at a defined absorbance ratio or at a certain weight percent range will allow the photo black, gray, and light gray inks to be nearly neutral in shade on paper.

As used herein, neutral black ink refers to a combination of an ink vehicle with at least carbon black (K) and usually in addition, cyan pigment (C). Either violet pigment (V) or magenta pigment (M) can also be added to K and C to create a neutral gray ink. Other formulations are possible for neutral gray inks. As is seen below, neutral black ink with either KCV or KCM pigments contains the same pigments as neutral light gray ink, neutral dark gray ink, and neutral medium gray ink. In other words, as defined in this application, neutral black ink can and sometimes is actually referred to as another shade of neutral gray ink.

In one embodiment, neutral black, gray and light gray ink can be obtained with one of the following, 1. A neutral black ink for ink jet printing, comprising: an ink vehicle; carbon black (K); cyan pigment (C) and violet pigment (V); wherein the weight percent of C=(0.15 to 0.3)·(weight percent of K) and the weight percent of V=(0.1 to 0.22)·(weight percent of K).
2. A neutral black ink for ink jet printing, comprising:
   an ink vehicle; carbon black (K); cyan pigment (C) and magenta pigment (M); wherein the weight percent of C=(0.35 to 0.5)–(weight percent of K) and the weight percent of M=(0.45 to 0.6)·(weight percent of K).
3. A neutral black ink for ink jet printing, comprising a mixture of at least two of the following inks:
   a) a neutral black ink comprising an ink vehicle and carbon black (K);
   b) a neutral black ink comprising an ink vehicle; carbon black (K), cyan pigment (C) and violet pigment (V); wherein the weight percent of C=(0.15 to 0.3)·(weight percent of K) and the weight percent of V=(0.1 to 0.22) ·(weight percent of K);
   c) a neutral black ink comprising an ink vehicle; carbon black (K), cyan pigment (C) and magenta pigment (M); wherein the weight percent of C=(0.35 to 0.5)·(weight percent of K) and the weight percent of M=(0.45 to 0.6)·(weight percent of K).

The disclosed ink sets include, in addition to a yellow pigment, a neutral blend black ink for ink-jet printing, comprising: an ink vehicle; carbon black (K), cyan pigment (C) and violet pigment (V) (or magenta pigment (M)). For a KCV blend, the optimal ratios were the following: the weight percent of C=(0.15 to 0.3)·(weight percent of K) and the weight percent of V=(0.1 to 0.22)·(weight percent of K). For a KCM blend, the optimal ratios were the following: the weight percent of C=(0.35 to 0.5)·(weight percent of K) and the weight percent of M=(0.45 to 0.6)·(weight percent of K). It is also possible to blend neutral gray ink, with either or both of the blends described above to obtain other neutral blends.

In one embodiment, the carbon black is selected from at least one of the following: FW18, FW2, FW1, FW200 (all manufactured by Degussa Inc.); Monarch 1100, Monarch 700, Monarch 800, Monarch 1000, Monarch 880, Monarch 1300, Monarch 1400, Regal 400R, Regal 330R, Regal 660R (all manufactured by Cabot Corporation); Raven 5750, Raven 250, Raven 5000, Raven 3500, Raven 1255, Raven 700 (all manufactured by Columbia Carbon, Inc.), or combinations thereof.

Colorants can be described herein by the colour index (CI) number, e.g., PB=pigment blue; PBl=pigment black; PR=pigment red; PV=pigment violet; PY=pigment yellow; etc. In one embodiment, the cyan pigment is a copper phthalocyanine pigment. In one embodiment, the cyan pigment can be selected from at least one of, but not limited to, the following: PB15:3, PB15:4, PB15:6, PB60, PB1, PB2, PB3, PB16, PB22, PB15:5, PB15:6, PB37, PB76, or combinations thereof.

In one embodiment, the violet pigment is a quinacridone pigment. In one embodiment, the violet pigment has a quinacridone or dioxazine based structure. In one embodiment, the violet pigment can be selected from at least one of, but not limited to, the following: PV19, PV42, PV23, PV3, PV19, PV23, PV32, PV36, PV38, PV93, or combinations thereof.

In one embodiment, the magenta pigment can be selected from at least one of, but not limited to, the following: PR122, PR192, PR202, PR206, PR207, PR209, PR43, PR194, PR112, PR123, PR168, PR184, PR5, PR7, PR12, PR48, PR57, PR57:1, or combinations thereof.

In one embodiment, the yellow pigment can be selected from at least one of, but not limited to, the following: PY65, PY74, PY83, PY 93, PY95, PY 110, PY111, PY128, PY151, PY 155, PY173, PY176, PY180, PY203, PY213, PY219, PY220, or combinations thereof.

The disclosure also relates to a neutral black ink for ink-jet printing, used in conjunction with a yellow pigment, the neutral black ink comprising: an ink vehicle; from about 1.5 to 2.5 weight percent carbon black; from about 0.6 to 1.1 weight percent PB15:3 cyan pigment; and from about 0.8 to 1.3 weight percent PR122 magenta pigment. The disclosure also relates to a neutral black ink for ink-jet printing, used in conjunction with a yellow pigment, the neutral black ink comprising: an ink vehicle; from about 1.6 to 2.7 weight percent carbon black; from about 0.3 to 0.7 weight percent PB15:3 cyan pigment; and from about 0.2 to 0.53 weight percent PV23 violet pigment.

In one embodiment, the neutral black ink is printed together with a neutral medium gray ink and a yellow pigment, the neutral medium gray ink comprising: an ink vehicle; from about 0.3 to 0.7 weight percent carbon black; from about 0.12 to 0.35 weight percent PB15:3 cyan pigment; and from about 0.15 to 0.42 weight percent PR122 magenta pigment. In one embodiment, the neutral black ink is printed together with a neutral medium gray ink and a yellow pigment, the neutral medium gray ink comprising: an ink vehicle; from about 0.3 to 0.55 weight percent carbon black; from about 0.07 to 0.13 weight percent PB15:3 cyan pigment; and from about 0.05 to 0.1 weight percent PV23 violet pigment. In one embodiment, the neutral black ink is printed together with a neutral dark gray ink, a neutral light gray ink, and a yellow pigment, the neutral dark gray ink comprising: an ink vehicle; from about 0.45 to 0.85 weight percent carbon black; from about 0.20 to 0.35 weight percent PB15:3 cyan pigment; and from about 0.25 to 0.43 weight percent PR122 magenta pigment; and the neutral light gray ink comprising: an ink vehicle; from about 0.16 to 0.28 weight percent carbon black; from about 0.070 to 0.12 weight percent PB15:3 cyan pigment; and from PR122 about 0.08 to 0.15 weight percent magenta pigment. In one embodiment, the neutral black ink is printed together with a neutral dark gray ink, a neutral light gray ink, and a yellow pigment, the neutral dark gray ink comprising: an ink vehicle; from about 0.50 to 0.88 weight percent carbon black; from about 0.12 to 0.21 weight percent PB15:3 cyan pigment; and from about 0.09 to 0.17 weight percent PV23 violet pigment; and the neutral light gray ink comprising: an ink vehicle; from about 0.15 to 0.3 weight percent carbon black; from about 0.04 to 0.07 weight percent PB15:3 cyan pigment; and from about 0.03 to 0.06 weight percent PV23 violet pigment.

When pigmented inks are used, three or more different blacks are often used: at least two for photo printing (photo black and gray) and one for plain paper application (matte black). Photo black is black ink that is ink-jet printed with maximum effectiveness on photo paper having a glossy surface. Photo black ink has carbon black pigments of a smaller size that matte black, thus making it highly reflective (glossy) when printed on glossy or semi-gloss photo paper. Matte black ink is black ink that is ink-jet printed with maximum effectiveness on plain paper or photo paper with a matte surface. Matte black ink has larger sized carbon black pigments that enhance its effectiveness for printing on plain paper or photo paper with a matte surface.

As non-limiting examples, the neutral inks of the present invention can be used in a 3-ink, 6-ink, or 8-ink ink set.

An example of a three-ink ink set is as follows:

For photo printing: A yellow and at least two of: neutral black, neutral dark gray, and neutral light gray.

For plain paper: A yellow and at least two of: neutral black, neutral dark gray, and matte black.

An example of a 6-ink ink set is as follows:

For photo printing: A yellow and at least neutral black and neutral gray. For example, the ink set could include: neutral black, neutral dark gray, neutral light gray, cyan, magenta (or violet), and yellow. Other variations include replacing light gray with light magenta; replacing light cyan and dark gray with light cyan and light magenta, respectively.

For plain paper: Neutral black, neutral dark gray, matte black, cyan, magenta (or violet), and yellow.

An example of an 8-ink ink set is as follows:

For photo printing: Neutral black, neutral dark gray, neutral light gray, cyan, light cyan, magenta (or violet), light magenta (or light violet), and yellow.

For plain paper: Neutral black, neutral dark gray, matte black, cyan, light cyan, magenta (or violet), light magenta (or light violet), and yellow.

For more than 4-ink printing, other colorants and gloss-enhancing fluids can be used.

A neutral medium gray ink was comprised of a blend of carbon black (0.5 weight percent), cyan pigment (0.202 weight percent PB 15:3), and magenta pigment (0.271 weight percent PR122) together with vehicle. The color of the neutral medium gray ink blend, the dots designated as 213 on the color map, was tested and the result was plotted on a color map shown in FIG. 2.

As a comparative example, FIG. 1 shows the browning of two conventional gray inks, 113 and 115, on a color map. The two gray inks, 113 and 115, were made of pure carbon black. The gray ink 113 is Epson 2200 Gray and 115 is 1% wt. Black Pearls 1100. This graph represents the change in the color of the patches as the patches increase in volumes of ink per unit area.

Figure 2:
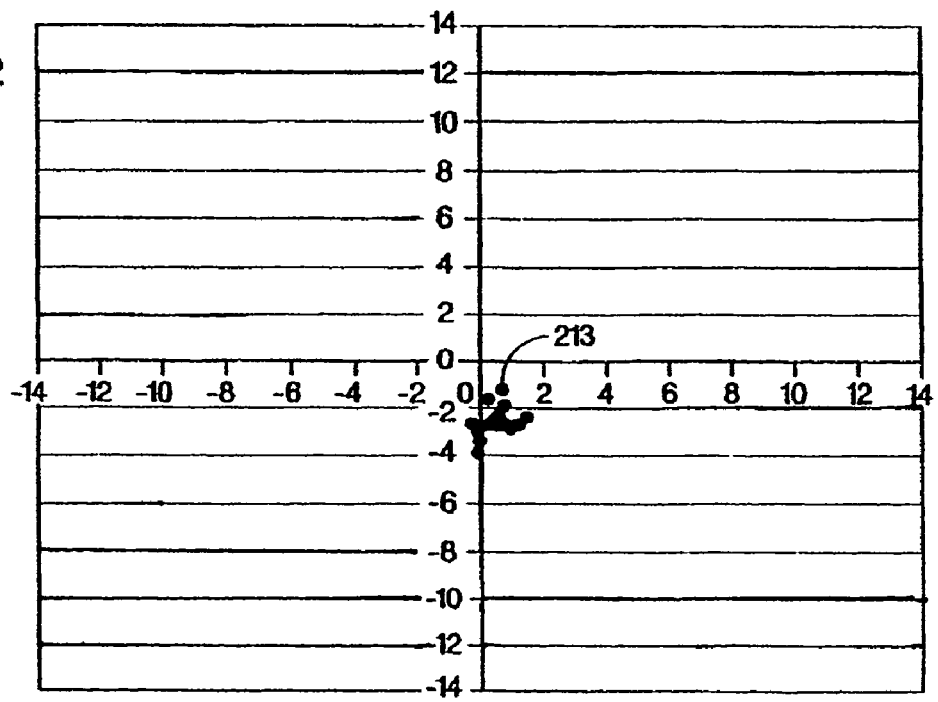
FIG. 2 is a graph in a*b* colorspace showing the neutrality of an exemplary blended neutral gray ink in an embodiment of the present invention.

FIG. 2 shows the neutrality of the neutral medium gray ink made as described above. Alternatively, the blend of the present invention can be made to achieve any L* value to satisfy the specific demands of the color map. A broad mixing ratio range in the blend of the present invention can be covered laterally in the "a" and "b" plane of the map and also along the L* axis.

A series of inks having several different weight percent compositions of the blends of black, cyan, violet (KCV) and black, cyan, magenta (KCM) pigments were obtained. These inks were then used to print a series of color patches at varying quantities of ink per unit area (0 to 180 ng/300 dpi pixel). The color of these patches was measured using the L*a*b* color space with D50 2 degree illuminant. A theoretical line was drawn through the data from the white point of the media to the desired black point of L*=5, a*=0, b*=−2. The residual from each data point to this theoretical line was calculated. A model was fitted to this residual data using MINITAB® software to predict the blends that would yield the smallest residuals from the theoretical line. The optimal ratios predicted using the MINITAB® model were made into inks with the target K (light, medium, dark gray) concentrations and tested. The results show these inks to be neutral. The target concentrations for the light, medium, and dark gray inks were then fit to a line to predict optimal ratios for any desired concentration of black pigment.

Exemplary KCV and KCM blend ratios for neutral black pigmented were obtained. These data are shown in Table 1 below.

TABLE 1

Exemplary KCV and KCM blend ratios

KCV Blends
Weight Percent

| K | C | V |
|---|---|---|
| 0.418 | 0.097 | 0.071 |
| 0.673 | 0.170 | 0.108 |
| 2.09 | 0.495 | 0.395 |

KCM Blends
Weight Percent

| K | C | M |
|---|---|---|
| 0.5 | 0.202 | 0.271 |
| 2 | 0.85 | 1.04 |

In one embodiment, pigments are selected for the colorant sets with similar lightfastness so that they will "fail" at the same time. Undue expense of a higher performance pigment than needed is thereby avoided. Thus, the disclosed colorant set is comprises of inks with pigments that are selected to be limited by the pigment with the least lightfastness, or in other words, the worst-performing color. It has been determined that cyan and magenta pigments fail much further out in time than yellow or neutral gray inks. Thus, each neutral gray ink (e.g., KCM, KCV) described herein is used in conjunction with a yellow pigment that fails at or about the same time.

Table 2 describes the lightfastness/lifetimes of various yellow inks, as tested on various media. In the Pigment column of the following tables, the numbers following the pigment name designate the name of the dispersion used from the vendor, e.g., the grade of pigment yellow used. For example, Grade A and Grade B are, respectively, plastics grade PY155 and 4G PY155, a high purity/quality yellow pigment. The PY74 pigments are special, fade resistant grades not typically encountered in non-photo quality inkjet printing inks.

In the following tables, the columns designated "0.6" and "1" indicate the optical densities at which failure point is determined. The Life column indicates the minimum lifetime of each ink. The optical densities of the inks were measured before and after exposure to light. The optical density loss criteria is then converted to years to failure, according to the conventional Wilhelm Imaging Research criteria known to those of ordinary skill in the art. The Corrected column indicates a correction back to a known standard. For the data in Tables 2 and 3, the Control had a measured life of 54.3, with a correction factor of 0.638, based on a photo glossy printing paper printed with an Epson Stylus Photo SP2200 printer. The Comment "No Fade" indicates that the ink failure point is too far out in time to be reliably estimated, which is indicative of premium yellow pigments, such as those used for automotive or outdoor sign applications.

In the following tables, the media type designated as "Glossy" is a glossy microporous coating on photo-based media manufactured by HP. The media types designated as "watercolor" and "photorag" are watercolor and photorag papers marketed by HP for its Designjet large format printers. The Loading column indicates the % solid of pigment in the ink tested.

TABLE 2

Pigment Yellow lifetimes

| Media | Pigment | Loading | 0.6 | 1 | Life | Corrected | Comment |
|---|---|---|---|---|---|---|---|
| Heavyweight Coated | PY128 | 5 | No Fade | 5219 | 5219 | 8177 | No Fade |
| Heavyweight Coated | PY128 | 6 | No Fade | 3228 | 3228 | 5058 | No Fade |
| Heavyweight Coated | PY155 | 5 | 296 | 479 | 296 | 463 | |
| Heavyweight Coated | PY155 | 6 | 325 | 556 | 325 | 508 | |
| Heavyweight Coated | PY74 | 4 | 69 | 88 | 69 | 109 | |
| Heavyweight Coated | PY74 | 4 | 59 | 78 | 59 | 93 | |
| Heavyweight Coated | PY74 | 5 | 67 | 85 | 67 | 105 | |
| Heavyweight Coated | PY93 | 5 | 388 | 595 | 388 | 607 | |
| Heavyweight Coated | PY93 | 6 | 425 | 684 | 425 | 666 | |
| Watercolor | PY128 | 5 | 2355 | 5646 | 2355 | 3690 | No Fade |
| Watercolor | PY128 | 6 | 2223 | 4443 | 2223 | 3482 | No Fade |
| Watercolor | PY155 | 5 | 189 | 482 | 189 | 295 | |
| Watercolor | PY155 | 6 | 202 | 477 | 202 | 316 | |
| Watercolor | PY74 | 4 | 54 | 75 | 54 | 85 | |
| Watercolor | PY74 | 4 | 44 | 65 | 44 | 70 | |
| Watercolor | PY74 | 5 | 53 | 76 | 53 | 83 | |
| Watercolor | PY93 | 5 | 266 | 668 | 266 | 417 | |
| Watercolor | PY93 | 6 | 356 | 724 | 356 | 558 | |
| Glossy | PY128 | 5 | 2514 | 1593 | 1593 | 2496 | No Fade |
| Glossy | PY128 | 6 | 2179 | 1680 | 1680 | 2633 | No Fade |
| Glossy | PY155 | 5 | 137 | 227 | 137 | 215 | |
| Glossy | PY155 | 6 | 182 | 272 | 182 | 285 | |
| Glossy | PY74 | 4 | 67 | 77 | 67 | 104 | |
| Glossy | PY74 | 4 | 56 | 62 | 56 | 87 | |
| Glossy | PY74 | 5 | 58 | 68 | 58 | 92 | |

TABLE 2-continued

Pigment Yellow lifetimes

| Media | Pigment | Loading | 0.6 | 1 | Life | Corrected | Comment |
|---|---|---|---|---|---|---|---|
| Glossy | PY93 | 5 | 255 | 379 | 255 | 400 | |
| Glossy | PY93 | 6 | 276 | 466 | 276 | 432 | |
| Photo Rag | PY128 | 5 | 3197 | 2412 | 2412 | 3780 | No Fade |
| Photo Rag | PY128 | 6 | 3981 | 2493 | 2493 | 3905 | No Fade |
| Photo Rag | PY155 | 5 | 179 | 454 | 179 | 281 | |
| Photo Rag | PY155 | 6 | 192 | 418 | 192 | 302 | |
| Photo Rag | PY74 | 4 | 54 | 73 | 54 | 84 | |
| Photo Rag | PY74 | 4 | 47 | 67 | 47 | 74 | |
| Photo Rag | PY74 | 5 | 61 | 81 | 61 | 95 | |
| Photo Rag | PY93 | 5 | 236 | 521 | 236 | 369 | |
| Photo Rag | PY93 | 6 | 324 | 651 | 324 | 507 | |

Table 3 describes the lightfastness/lifetimes of exemplary black inks (KCM, M1), as tested on various media.

TABLE 3

Black ink lifetimes

| Media | Loading | 0.6 | 1 | Life | Corrected |
|---|---|---|---|---|---|
| Heavyweight Coated | 0.49 | 340 | No Data | 340 | 533 |
| Heavyweight Coated | 0.65 | 334 | No Data | 334 | 523 |
| Heavyweight Coated | 0.76 | 338 | No Data | 338 | 530 |
| Heavyweight Coated | 2.31 | 349 | 1150 | 349 | 547 |
| Heavyweight Coated | 3.08 | 390 | 963 | 390 | 611 |
| Heavyweight Coated | 3.62 | 297 | 965 | 297 | 466 |
| Watercolor | 0.49 | 465 | No Data | 465 | 728 |
| Watercolor | 0.65 | 410 | No Data | 410 | 643 |
| Watercolor | 0.76 | 436 | 710 | 436 | 683 |
| Watercolor | 2.31 | 680 | 1230 | 680 | 1065 |
| Watercolor | 3.08 | 727 | 1264 | 727 | 1139 |
| Watercolor | 3.62 | 777 | 1213 | 777 | 1217 |
| Glossy | 0.49 | 274 | 398 | 274 | 429 |
| Glossy | 0.65 | 279 | 402 | 279 | 437 |
| Glossy | 0.76 | 295 | 367 | 295 | 463 |
| Glossy | 2.31 | 408 | 492 | 408 | 639 |
| Glossy | 3.08 | 353 | 513 | 353 | 553 |
| Glossy | 3.62 | 294 | 428 | 294 | 461 |
| Photo Rag | 0.49 | 406 | No Data | 406 | 637 |
| Photo Rag | 0.65 | 404 | No Data | 404 | 633 |
| Photo Rag | 0.76 | 423 | 654 | 423 | 663 |
| Photo Rag | 2.31 | 563 | 926 | 563 | 881 |
| Photo Rag | 3.08 | 700 | 1362 | 700 | 1097 |
| Photo Rag | 3.62 | 822 | 1431 | 822 | 1288 |

Table 4 below describes the lightfastness/lifetimes of exemplary black inks (KCM, M1), as tested on various media and compared to lifetimes of a high quality PY155. The Loading of "G" indicates a dark gray ink with a pigment loading of about 3.08% solids in the ink; the Loading of "lg" indicates a light gray ink with a pigment loading of about 0.6% solids; and the Loading of "mg" indicates a medium gray ink with a pigment loading of about 1.2% solids.

TABLE 4

Black ink lifetimes and PY155 lifetimes

| Pigment | Loading | Media | Min Life | Corrected | High quality PY155 compare |
|---|---|---|---|---|---|
| KCM | G | Heavyweight Coated | 401 | 765 | 592 |
| KCM | lg | Heavyweight Coated | 270 | 515 | |
| KCM | mg | Heavyweight Coated | 380 | 726 | |
| KCV | G | Heavyweight Coated | 247 | 471 | 592 |
| KCV | lg | Heavyweight Coated | 479 | 913 | |
| KCV | mg | Heavyweight Coated | 407 | 776 | |
| KCM | G | Glossy | 244 | 465 | 457 |
| KCM | lg | Glossy | No Data | No Data | |
| KCM | mg | Glossy | 441 | 841 | |
| KCV | G | Glossy | 248 | 473 | 457 |
| KCV | lg | Glossy | 628 | 1198 | |
| KCV | mg | Glossy | 616 | 1174 | |
| KCM | G | Photo Rag | 62 | 118 | 504 |
| KCM | lg | Photo Rag | 62 | 117 | |
| KCM | mg | Photo Rag | 51 | 97 | |
| KCV | G | Photo Rag | 116 | 222 | 504 |
| KCV | lg | Photo Rag | 198 | 378 | |
| KCV | mg | Photo Rag | 185 | 353 | |
| KCM | G | Watercolor | 71 | 135 | 529 |
| KCM | lg | Watercolor | 65 | 125 | |
| KCM | mg | Watercolor | 59 | 112 | |
| KCV | G | Watercolor | 326 | 622 | 529 |
| KCV | lg | Watercolor | 638 | 1216 | |
| KCV | mg | Watercolor | 545 | 1040 | |

Examination of the various data for failure rates and lifetimes of various inks and pigments reveals that there are two levels of neutral gray ink performance. On fine art watercolor and photorag media, KCV inks have about twice the lifetime of KCM inks. Glossy media demonstrates similar performance between the two inks.

Based on the data determined above, a high quality yellow pigment is a good match for the KCV system because it fails at a similar time as the gray inks on watercolor and glossy media. On photorag media the gray inks fail rapidly, so they "limit" the system. On the heavyweight coated, neither KCM nor KCV offers a significant advantage. Therefore, to obtain similar failure rates, exemplary yellow pigments used in conjunction with the KCV ink system include PY155 or PY93. Comparing the high quality to "standard" quality grade PY155 in Table 5 demonstrates an approximately 2× improvement gained by using the high quality Py155.

TABLE 5

PY155 Summary - across tests

| Pigment | Loading | Media | Test | Life 0.6 OD |
|---|---|---|---|---|
| PY155 | 5 | Glossy | December 03 | 137 |
| | 6 | Glossy | December 03 | 182 |
| PY155 (Grade A) | 4 | Glossy | February 04 | 90 |
| | 5 | Glossy | February 04 | 98 |
| PY155 (Grade B) | 4 | Glossy | February 04 | 123 |
| | 5 | Glossy | February 04 | 125 |
| PY155 | 5 | Watercolor | December 03 | 189 |
| | 6 | Watercolor | December 03 | 202 |
| PY155 (Grade A) | 4 | Watercolor | February 04 | 165 |
| | 5 | Watercolor | February 04 | 186 |
| PY155 (Grade B) | 4 | Watercolor | February 04 | 197 |
| | 5 | Watercolor | February 04 | 190 |

TABLE 5-continued

PY155 Summary - across tests

| Pigment | Loading | Media | Test | Life 0.6 OD |
|---|---|---|---|---|
| PY155 | 5 | Heavyweight Coated | December 03 | 296 |
| | 6 | Heavyweight Coated | December 03 | 325 |
| PY155 (Grade A) | 4 | Heavyweight Coated | February 04 | 121 |
| | 5 | Heavyweight Coated | February 04 | 127 |
| PY155 (Grade B) | 4 | Heavyweight Coated | February 04 | 147 |
| | 5 | Heavyweight Coated | February 04 | 150 |

Table 6 demonstrates that PY93 delivers about twice the performance of standard quality PY155. Therefore, PY93 would also be a good match for the KCV system. Here, the difference is much smaller on heavyweight paper, so PY93 is slightly less preferred. Based on their chemical structure, it is understood that other yellow pigments that will perform comparably to PY155 and PY93 and can be used with the KCV system.

TABLE 6

Mixed Yellow Results (Uncontrolled)

| Pigment | Loading | Media | Life 0.6 OD |
|---|---|---|---|
| PY155 (Grade A) | 4 | Glossy | 90 |
| | 5 | Glossy | 98 |
| PY155 (Grade B) | 4 | Glossy | 123 |
| | 5 | Glossy | 125 |
| PY93 | 4 | Glossy | 190 |
| | 5 | Glossy | 197 |
| PY155 (Grade A) | 4 | Watercolor | 165 |
| | 5 | Watercolor | 186 |
| PY155 (Grade B) | 4 | Watercolor | 197 |
| | 5 | Watercolor | 190 |
| PY93 | 4 | Watercolor | 215 |
| | 5 | Watercolor | 244 |
| PY155 (Grade A) | 4 | Heavyweight Coated | 121 |
| | 5 | Heavyweight Coated | 127 |
| PY155 (Grade B) | 4 | Heavyweight Coated | 147 |
| | 5 | Heavyweight Coated | 150 |
| PY93 | 4 | Heavyweight Coated | 143 |
| | 5 | Heavyweight Coated | 183 |

Returning to Table 2, Py128 exhibits essentially no fade on the tested media. However, PY128 is an expensive pigment that has low intrinsic color strength, which limits gamut or is used in very high loadings in an ink. The PY155 used to generate the data in the tables is also a high quality material. PY74 is another material of great interest in the ink-jet industry due to its very high color strength. The PY74 used in the data above has enhanced lightfastness, and is available in highly transparent grade. The PY74 is slightly inferior to the KCM on photorag and watercolor, and significantly inferior on glossy and heavyweight coated media. Thus, PY74 blended with a higher performance pigment, such as PY93 or PY155, which are somewhat lightfast, is a good match for the KCM neutral gray ink system. It should be noted that there can also be a significant ink vehicle effect for some media, such as photorag.

While blending dyes is a common practice in the inkjet industry, blending pigments is rare and made difficult by particle colloidal stability, but has been achieved with the disclosed pigments that, in addition, provide high gloss and durability on glossy surfaces. The disclosed pigments are blended together and made dispersible in aqueous solutions using polymers and specific dispersion systems that are known. As a non-limiting example of one type of such dispersion system, the surface of a pigment and/or carbon black is attached to or associated with a polymer or polymers. Such systems have been described in the following patents or patent applications: U.S. Pat. Nos. 6,506,240, 6,648,953, and U.S. patent application Ser. No. 2001/0035110 (all assigned to Seiko Epson Corporation); U.S. Pat. No. 6,494,943 and U.S. patent application Nos. 2003/0205171 and 2002/0005146 (all assigned to Cabot Corporation); and U.S. Pat. No. 6,555,614 (assigned to Dainippon Ink and Chemicals, Inc.), such descriptions of which are incorporated herein by reference. As a non-limiting example of another type of such dispersion system, the pigment and/or carbon black is encapsulated by a polymer or polymers. Such systems have been described in the following patents or patent applications: U.S. Pat. Nos. 6,074,467, 5,741,591, 5,556,583, 4,740,546, and 4,170,582 (all assigned to Dainippon Ink and Chemicals, Inc.); and U.S. patent application Ser. No. 2003/0195274 (assigned to Seiko Epson Corporation).

In one embodiment of a dispersion system used in the present invention, the polymer or polymers associated with the surface of a pigment and/or carbon black is an acrylate.

In addition to providing perfect neutrality, reduced browning, and balanced lightfastness, the disclosed colorant sets provide a solution for out-of-box black and white printing. The present disclosure also provides for cost saving for printers on closed-loop color calibration. Furthermore, the disclosed ink sets significantly improve image qualities, especially in shadow detail and granularity as well as in gloss uniformity. Using blended inks instead of KCMY composite also reduces total ink flux on paper.

Many variations and modifications may be made to the above-described embodiments. All such modifications and variations are intended to be included herein within the scope of this disclosure and protected by the following claims.

The invention claimed is:

1. An ink set for ink jet printing comprising:
   a neutral black ink comprising:
     an ink vehicle, and
     a black pigment (K), cyan pigment (C), and violet pigment (V); and
   a yellow ink comprising:
     an ink vehicle, and
     yellow pigment having comparable lightfastness as the neutral black ink.

2. The ink set of claim 1, wherein the KCV blend has a composition in which C weight percent=(0.15 to 0.3)·(weight percent of K) and V weight percent=(0.1 to 0.22)·(weight percent of K).

3. The ink set of claim 2, wherein the blend of KCV comprises from about 1.6 to 2.7 weight percent carbon black; from about 0.3 to 0.7 weight percent PB15:3 cyan pigment; and from about 0.2 to 0.53 weight percent PV23 violet pigment.

4. The ink set of claim 1, wherein the yellow pigment is chosen from at least one of the following: PY155, PY93, and combinations thereof.

5. The ink set of claim 4, wherein the blend of KCV comprises carbon black, PV23, and PB15:3.

6. An ink set for ink jet printing comprising:
   a neutral black ink comprising:
     an ink vehicle, and
     a blend of a black pigment (K), cyan pigment (C), and magenta pigment (M); and
   a yellow ink comprising:
     an ink vehicle, and yellow pigment having comparable lightfastness as the neutral black ink.

7. The ink set of claim 6, wherein the KCM blend has a composition in which C weight percent=(0.35 to 0.5)·(K weight percent) and M weight percent=(0.45 to 0.6)·(K weight percent).

8. The ink set of claim 7, wherein the blend of KCM comprises from about 1.5 to 2.5 weight percent carbon black; from about 0.6 to 1.1 weight percent PB15:3 cyan pigment; and from about 0.8 to 1.3 weight percent PR122 magenta pigment.

9. The ink set of claim 6, wherein the yellow pigment is PY74.

10. The ink set of claim 9, wherein the blend of KCM comprises PBI07, PR122, and PB15:3.

11. An ink set for inkjet printing comprising:
a neutral black ink; and
at least one ink selected from the group consisting of: neutral medium gray ink, neutral dark gray ink, neutral light gray ink, cyan ink, magenta ink, yellow ink, light cyan ink, light magenta ink, red ink, green ink, blue ink, violet ink and orange ink;
wherein the neutral black ink comprises an ink vehicle, a black pigment (K), cyan pigment (C), and violet pigment (V); and
wherein the yellow ink comprises a yellow pigment that fails at approximately the same rate or time as the black pigment.

12. The ink set of claim 11, wherein the KCV blend has a composition in which C weight percent=(0.15 to 0.3)·(weight percent of K) and V weight percent=(0.1 to 0.22)·(weight percent of K).

13. The ink set of claim 11, wherein the neutral medium gray ink comprises from about 0.3 to 0.55 weight percent carbon black; from about 0.07 to 0.13 weight percent PB15:3 cyan pigment; and from about 0.05 to weight percent PV23 violet pigment.

14. The ink set of claim 11, wherein the neutral medium gray ink comprises from about 0.3 to 0.7 weight percent carbon black; from about 0.12 to 0.35 weight percent PB15:3 cyan pigment; and from about 0.15 to 0.42 weight percent PR122 magenta pigment.

15. The ink set of claim 11, wherein the neutral dark gray ink comprises from about 0.45 to 0.85 weight percent carbon black; from about 0.20 to 0.35 weight percent PB15:3 cyan pigment; and from about 0.25 to 0.43 weight percent PR122 magenta pigment.

16. The ink set of claim 11, wherein the neutral dark gray ink comprises from about 0.50 to 0.88 weight percent carbon black; from about 0.12 to 0.21 weight percent PB15:3 cyan pigment; and from about 0.09 to 0.17 weight percent PV23 violet pigment.

17. The ink set of claim 11, wherein the neutral light gray ink comprises from about 0.16 to 0.28 weight percent carbon black; from about 0.070 to 0.12 weight percent PB15:3 cyan pigment; and from PR122 about 0.08 to 0.15 weight percent magenta pigment.

18. The ink set of claim 11, wherein the neutral light gray ink comprises from about 0.15 to 0.3 weight percent carbon black; from about 0.04 to 0.07 weight percent PB15:3 cyan pigment; and from about 0.03 to 0.06 weight percent PV23 violet pigment.

19. The ink set of claim 11, wherein the yellow pigment is chosen from at least one of the following: PY155, PY93, and combinations thereof.

20. The ink set bin of claim 19, wherein the blend of KCV comprises carbon black, PV23, and PB15:3.

21. An ink set for inkjet printing comprising:
a neutral black ink; and
at least one ink selected from the group consisting of: neutral medium gray ink, neutral dark gray ink, neutral light gray ink, cyan ink, magenta ink, yellow ink, light cyan ink, light magenta ink, red ink, green ink, blue ink, violet ink and orange ink;
wherein the neutral black ink comprises an ink vehicle, a black pigment (K), cyan pigment (C), and magenta pigment (M); and
wherein the yellow ink comprises a yellow pigment that fails at approximately the same rate as the black pigment.

22. The ink set of claim 21, wherein the KCM blend has a composition in which C weight percent=(0.35 to 0.5)·(K weight percent) and M weight percent=(0.45 to 0.6)·(K weight percent).

23. The ink set of claim 21, wherein the neutral medium gray ink comprises from about 0.3 to 0.55 weight percent carbon black; from about 0.07 to 0.13 weight percent PB15:3 cyan pigment; and from about 0.05 to weight percent PV23 violet pigment.

24. The ink set of claim 21, wherein the neutral medium gray ink comprises from about 0.3 to 0.7 weight percent carbon black; from about 0.12 to 0.35 weight percent PB15:3 cyan pigment; and from about 0.15 to 0.42 weight percent PR122 magenta pigment.

25. The ink set of claim 21, wherein the neutral dark gray ink comprises from about 0.45 to 0.85 weight percent carbon black; from about 0.20 to 0.35 weight percent PB15:3 cyan pigment; and from about 0.25 to 0.43 weight percent PR122 magenta pigment.

26. The ink set of claim 21, wherein the neutral dark gray ink comprises from about 0.50 to 0.88 weight percent carbon black; from about 0.12 to 0.21 weight percent PB15:3 cyan pigment; and from about 0.09 to 0.17 weight percent PV23 violet pigment.

27. The ink set of claim 21, wherein the neutral light gray ink comprises from about 0.16 to 0.28 weight percent carbon black; from about 0.070 to 0.12 weight percent PB15:3 cyan pigment; and from PR122 about 0.08 to 0.15 weight percent magenta pigment.

28. The ink set of claim 21, wherein the neutral light gray ink comprises from about 0.15 to 0.3 weight percent carbon black; from about 0.04 to 0.07 weight percent PB15:3 cyan pigment; and from about 0.03 to 0.06 weight percent PV23 violet pigment.

29. The ink set of claim 21, wherein the yellow pigment is PY74.

30. The ink set of claim 29, wherein the blend of KCM comprises carbon black, PR122, and PB15:3.

31. A method of printing gray, black, neutral, and color areas with ink-jet printing comprising:
printing on a medium with an ink set of neutral black ink, yellow ink, and at least one ink selected from the group consisting of neutral medium gray ink, neutral dark gray ink, neutral light gray ink, cyan ink, magenta ink, light cyan ink, light magenta ink, red ink, green ink, blue ink, violet ink and orange ink;
wherein the neutral black ink comprises:
an ink vehicle, and
a blend of carbon black (K); cyan pigment (C) and a violet pigment (V) or magenta pigment (M); wherein the KCV blend has a composition in which C weight percent=(0.15 to 0.3)·(K weight percent) and the V weight percent=(0.1 to 0.22)·(K weight percent); and wherein the KCM blend has a composition in which C weight percent=(0.35 to 0.5)·(K weight percent) and M weight percent=(0.45 to 0.6)·(K weight percent); and selecting yellow pigment for the yellow ink that will have a comparable lifespan as the black pigment.

32. The method of claim 31, wherein when the neutral black ink comprises KCV, the step of selecting yellow pigment comprises selecting at least one of the following: PY155, PY93, and combinations thereof.

33. The method of claim 31, wherein when the neutral black ink comprises KCM, the step of selecting yellow pigment comprises selecting PY74.

* * * * *

UNITED STATES PATENT AND TRADEMARK OFFICE
CERTIFICATE OF CORRECTION

PATENT NO. : 7,452,415 B2
APPLICATION NO. : 11/290094
DATED : November 18, 2008
INVENTOR(S) : Howard Doumaux et al.

It is certified that error appears in the above-identified patent and that said Letters Patent is hereby corrected as shown below:

In column 7, line 64, delete "Ig" and insert -- lg --, therefor.

In column 11, line 36, in Claim 13, after "to" insert -- 0.1 --.

In column 12, line 21, in Claim 23, after "to" insert -- 0.1 --.

Signed and Sealed this

Twenty-second Day of June, 2010

David J. Kappos
*Director of the United States Patent and Trademark Office*